Oct. 9, 1928.  
A. A. WIEDMAIER  
1,687,075  
VARIABLE SPEED TRANSMISSION MECHANISM  
Filed June 6, 1927   3 Sheets-Sheet 1

Inventor  
Arthur A. Wiedmaier,  
By  
Attorneys

Oct. 9, 1928.　　　　　　　　　　　　　　　　1,687,075
A. A. WIEDMAIER
VARIABLE SPEED TRANSMISSION MECHANISM
Filed June 6, 1927　　　3 Sheets-Sheet 3
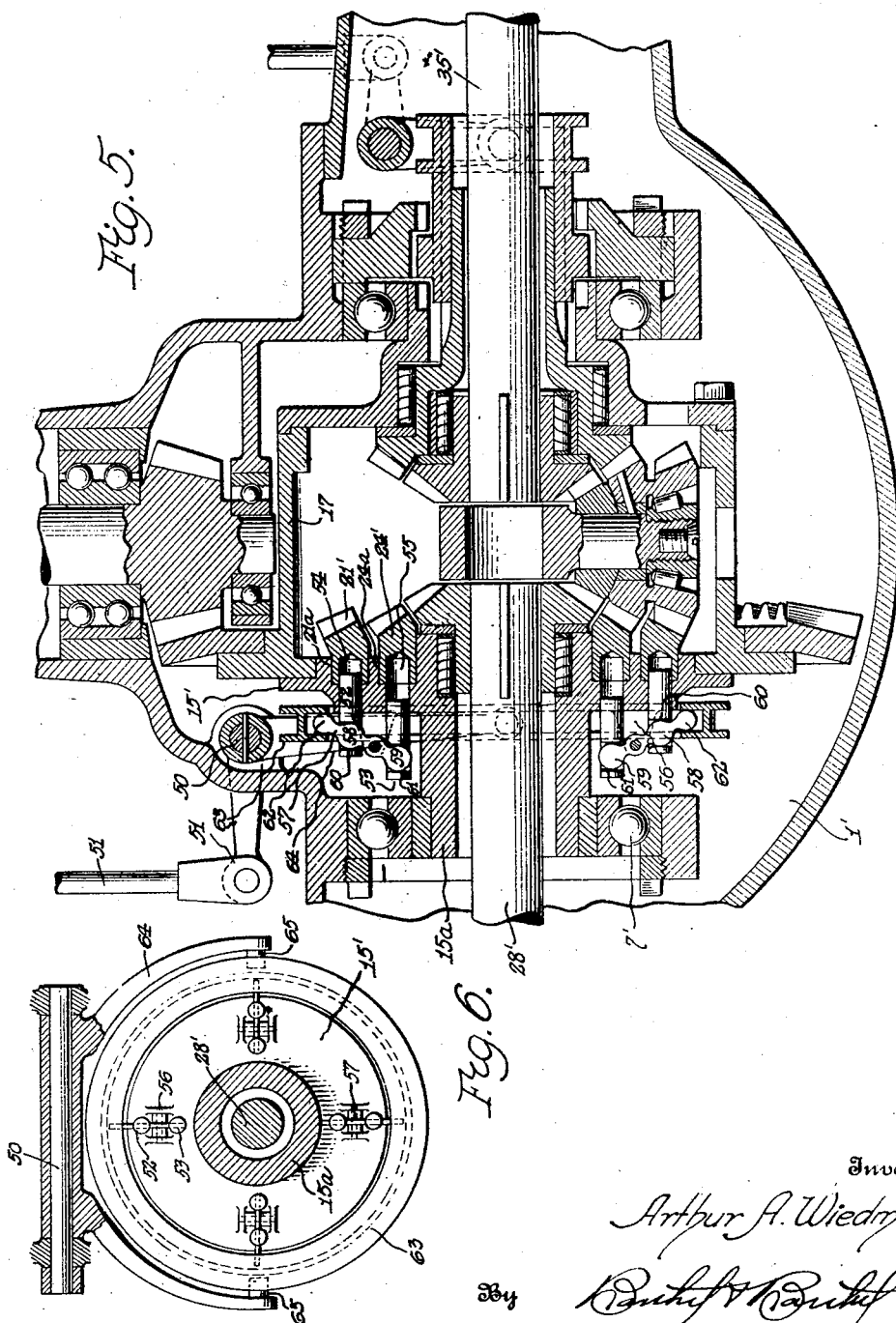
Inventor
Arthur A. Wiedmaier,
By
Attorneys Patented Oct. 9, 1928.

1,687,075

UNITED STATES PATENT OFFICE.

ARTHUR A. WIEDMAIER, OF CLEVELAND, OHIO, ASSIGNOR OF ONE-HALF TO LLOYD M. FIELD, OF CLEVELAND, OHIO.

VARIABLE-SPEED-TRANSMISSION MECHANISM.

Application filed June 6, 1927. Serial No. 196,727.

This invention relates to variable speed transmission mechanisms of that type associated with the rear axle assembly of a motor driven vehicle, and more particularly to a reduction gear mechanism which is built about a beveled gear differential mechanism in a rear axle housing.

My invention aims to provide a simple, durable and compact variable speed transmission wherein clutches are associated with reduction gears and differential casing for obtaining intermediate and low speeds, one of said clutches serving as a conditioning clutch by which the other clutch is operative for reduced speeds.

My invention further aims to provide a differential mechanism in which reduction gears are embodied with a full floating spider affording a bearing for differential and reduction pinions which cooperate with the differential and reduction gears in providing reduced speeds for rear axle shafts.

My invention includes certain manufacturing refinements that are of an advantageous nature and my various improvements will be hereinafter specifically described and then claimed.

Reference will now be had to the drawing, wherein

Fig. 5 is a section similar to Figure 1 and showing a modified form of clutch mechanism; and Fig. 6 is an elevation of said mechanism showing associated parts in section.

Figure 1:
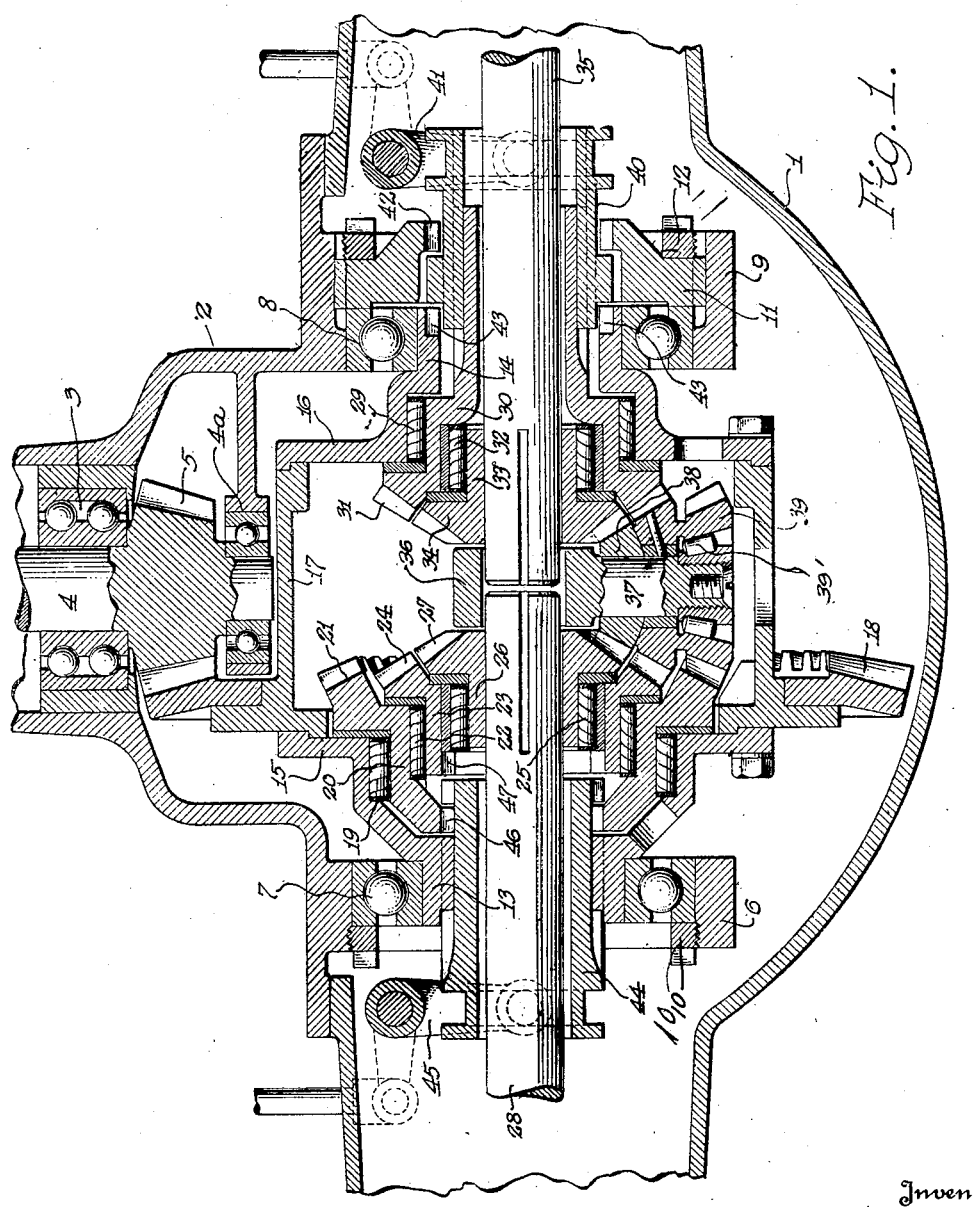
Figure 1 is a longitudinal horizontal sectional view of a variable speed transmission showing the conditioning and reduction clutches in neutral position.

In the drawings the reference numeral 1 generally denotes a portion of a rear axle housing, preferably a middle portion of the housing which may be provided with a detachable plate 2 having a bearing structure 3 for a drive shaft 4. There may be an additional bearing structure 4ᵃ for the inner end of the drive shaft 4, so that this end of the drive shaft may safely support a small beveled gear wheel 5.

The detachable plate 2 is provided with supports 6 and 9 for anti-frictional bearing structures 7 and 8, the former being retained in the support 6 by a retaining ring 10 and the latter retained in the support 9 by a fixed element 11 and a retaining ring 12. The fixed element may be keyed or otherwise non-rotatably mounted in the support 9.

Journaled in the anti-frictional bearing structures 7 and 8 are the hub portions 13 and 14 of end plates 15 and 16 respectively forming part of a differential casing 17 provided with a large beveled gear wheel 18 meshing with the small beveled gear wheel 5 of the drive shaft 4.

Mounted in the differential casing end plate 15 is an anti-frictional roller bearing 19 for the hub portion 20 of an intermediate speed gear 21. Mounted in the hub portion 20 of this intermediate speed gear 21 is an anti-frictional roller bearing 22 for the hub portion 23 of a low speed gear 24. Mounted in the hub portion 23 of the low speed gear 24 is an anti-frictional roller bearing 25 for the hub portion 26 of a differential gear 27. The gears 21, 24 and 27 are in nested relation concentrically of one another and about a rear axle shaft 28 on which the differential gear 27 is keyed or non-rotatably fixed.

Mounted in the differential casing end plate 16 is an anti-frictional roller bearing 29 for the hub portion 30 of a speed gear 31, and mounted in the hub portion 30 of this gear is an anti-frictional roller bearing 32 for the hub portion 33 of a differential gear 34. The gears 31 and 34 are concentric of each other about a rear axle shaft 35 on which the differential gear 34 is keyed or non-rotatably fixed. The rear axle shafts 35 and 28 longitudinally aline substantially axially of the rear axle housing 1 and are adapted for driving ground engaging wheels of a vehicle.

In the differential casing 17 is a spider 36 having its arms 37 provided with differential pinions 38 and compound speed pinions 39, the latter being operatively held relative to the spider arms 37 by anti-frictional roller structures 39'. I have deemed it only necessary to illustrate one of the spider arms 37 and its assembly of pinions, and since the spider 36 has no bearing on the differential casing 17, it may be considered as full floating. However, in carrying out part of the usual practice of arranging a spider between the differential gears 27 and 34, the confronting ends of the rear axle shafts 28 and 35 may extend into the spider 36. The inner ends of the rear axle shafts are adequately supported through the various differential and speed gears and the differential casing end plates relative to the rear axle housing, and it is obvious that there may be other bearings in the housing for the rear axle shafts, which bearings I have deemed unnecessary to illustrate.

A slidable toothed clutch member 40 is splined or otherwise slidably keyed on the hub portion 30 of the speed gear 31 to rotate therewith and said clutch member is shiftable in two directions by a conventional form of clutch shifting device generally designated 41. The clutch member 40 is employed for conditioning purposes and as such is engageable, when moved in one direction with a clutch member 42 forming part of the fixed element 11, and when shifted in an opposite direction is engageable with a clutch member 43 forming part of the hub portion 14 of the differential casing end plate 16. This conditioning clutch will be hereinafter considered when describing the operation of the transmission mechanism.

A reduction clutch 44 is slidably mounted in the hub portion 13 of the differential casing end plate 15, said clutch member being splined or slidably keyed for rotation with the hub portion 13 of the end plate 15. A conventional form of clutch shifting device 45 may be employed for shifting the clutch member 44.

Complemental to the clutch member 44 are clutch members 46 and 47, the former being a part of the hub portion 20 of the intermediate speed gear 21, and the latter a part of the hub portion 23 of the low speed gear 24. The reduction clutch 44 can be shifted to establish rotative continuity between the differential casing 17 and the intermediate speed gear 21 or between the differential casing 17 and the low speed gear 24.

Operation. The transmission mechanism, as shown in Fig. 1, is in what may be considered a neutral condition, that is, the conditioning clutch 40 is out of engagement with its complemental clutch members 42 and 43. The reduction clutch 44 is out of engagement with its complemental clutch members 46 and 47, therefore the differential casing 17 may be driven without imparting rotation to the rear axle shafts 28 and 35.

For a maximum reduction or low speed the conditioning clutch 40 is shifted into engagement with the clutch member 42 of the fixed element 11, whereby the speed gear 31 is held stationary. The reduction clutch 44 is shifted to engage the clutch member 47 of the low speed gear 24, so that the driven differential casing 17 and the low speed gear 24 rotate in synchronism by virtue of the clutch 44 connecting the differential casing to the low speed gear. With the low speed gear 24 driven the compound pinion 39 rolls about the stationary speed gear 31 and thus transmits a reduced speed to the spider structure which through the differential pinions 38 and the differential gears 27 and 34 imparts rotation to the rear axle shafts 28 and 35. These shafts, of course, have the usual differential action when necessary.

Figure 2:
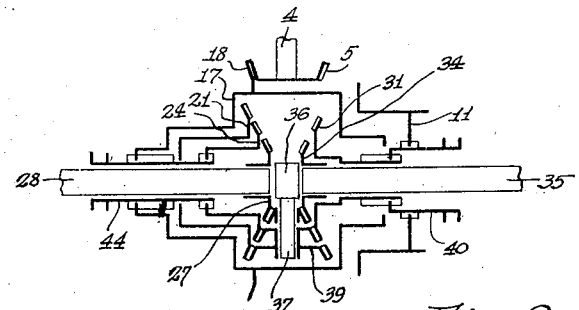
Fig. 2 is a diagrammatic view of the transmission mechanism showing the clutches adjusted for a maximum reduction or low speed.
Figure 3:
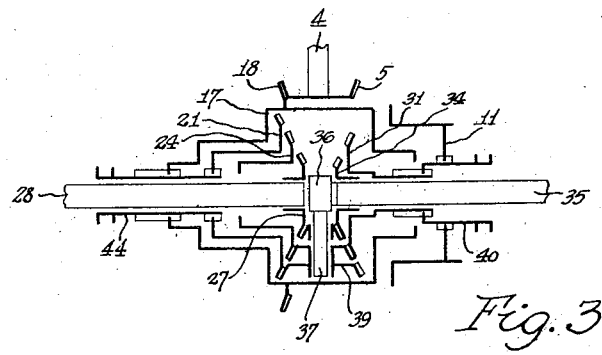
Fig. 3 is a similar view showing the clutches adjusted for an intermediate reduction or intermediate speed.
Figure 4:
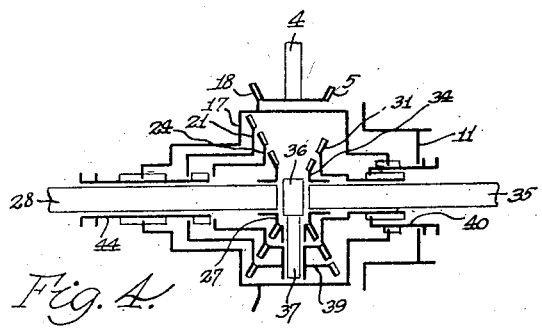
Fig. 4 is a similar view showing the clutches adjusted for full gear ratio or high speed.

An intermediate speed or an intermediate reduction is attained by leaving the clutch 40 in engagement with the clutch member 42 of the fixed element 11, and shifting the clutch 44 into engagement with the clutch member 46 of the intermediate speed gear 21. As this intermediate speed gear is driven from the differential casing 17 the compound pinion 39 with which it meshes will roll on the stationary speed gear 31 and provide a different speed from that diagrammatically illustrated in Fig. 2.

A high speed is attained by placing the reduction clutch 44 in mesh with clutch member 47 and shifting the conditioning clutch 40 into engagement with the clutch member 43 of the differential casing end plate 16. This means that the controlled gear 31 will be driven by the differential casing 17 and through the medium of the compound pinion 39 drive the spider at a greater speed than if it were rolling on a stationary gear.

The above operations may be summarized as follows:

When clutch 40 is in engagement with fixed element 11, there is a maximum reduction when clutch 44 engages gear 24, and an intermediate reduction when clutch 44 engages gear 21.

When clutch 40 is in engagement with the differential casing 17 and clutch 44 in engagement with gear 24 there is a full gear ratio and no reduction.

When clutch 44 is in engagement with gear 21 there is an intermediate reduction only when clutch 40 is engaged with the fixed element 11, and when clutch 44 is in engagement with gear 24 there is a maximum reduction only when clutch 44 is in engagement with the fixed element 11.

In the modified clutch construction shown in Figures 5 and 6, the end plate 15' is formed with a sleeve 15ª surrounding and spaced from the axle 28' and having one end supported in the casing 1' through the medium of ball bearings 7'. In the face of the end plate are formed annular grooves 21ª and 24ª which loosely receive the intermediate speed gear 21' and low speed gear 24' respectively.

A spindle 50 is journaled in the casing at right angles to the axle 28' and may be turned by linkage 51 extending to a point within reach of the operator. Pins 52 and 53 are slidably mounted in the end plate 15' and are adapted to enter pockets 54 and 55 formed in the gears 21' and 24' respectively. The pins are provided in pairs as clearly shown in Figure 6, the outermost member of each pair being associated with the gear 21' and the inner member with the gear 24'. At each pair of pins the end plate 15' is formed with a pair of ears 56 between which is pivoted a rocker arm 57 having enlargements 58 and 59 formed at opposite sides of the pivot point and received in recesses 60 and 61 cut in the pins 52 and 53 respectively. The enlargement 61 is at one of the extremities of the rocker arm, and the other extremity 62 is extended beyond the other enlargement 58.

A ring 63 of double channel formation engages the extremities 62 of the rocker arms. To the spindle 50 is fixed a yoke 64 provided at its ends with pins 65 entering the outer channel of the ring as shown more clearly in Figure 6. Actuation of the linkage 51 will move the ring and consequently the rocker arms and pins in one direction or the other.

The length of the pins and the amplitude of the movements of the rocker arms are such that the pins may secure only one of the gears 21' and 24' at a time to the end plate 15'. Also, a neutral position may be obtained, wherein neither gear is locked to the plate. The operation of the device in its various adjustments is similar to the operation of the construction shown in Figure 1.

I attach considerable importance to the fact that a full gear ratio is attained by the clutch 40 engaging the differential casing 17 regardless of the position of the clutch 44, which is a reduction clutch serving the gears 21 and 24 and the speed of these gears is conditioned by the clutch 40 holding the speed gear 31 stationary. Furthermore and from a manufacturing standpoint the spider structure is an assembled unit that may be readily assembled between the nested concentric gears and with these elements supported from the plate 2 of the rear axle housing, it is an easy matter to remove the differential and reduction gear mechanism after the inner ends of the axle shafts have been withdrawn. All of this contributes to a very compact easily assembled mechanism and while I have shown a preferred embodiment of my invention, it is to be understood that the structural elements are susceptible of such changes as are permissible by the appended claims.

What I claim is:—

1. In a variable speed transmission mechanism, a driven differential casing, axle shafts extending therein, differential gears operatively connecting said axle shafts, change speed gears rotatable about the differential gears in said casing, means operatively connecting said change speed gears to said differential gears, a conditioning clutch adapted to connect one of said speed gears to said differential casing for high speed and fix the same change speed gear for other speeds, and a reduction clutch driven by said differential casing and adapted to be connected to other of said change speed gears to establish low and intermediate speeds.

2. A variable speed transmission mechanism as called for in claim 1 wherein said connecting means comprises a spider rotatable about said shaft and having arms, and gears on said arms meshing with said change speed gears and certain of said differential gears.

3. In a variable speed transmission mechanism, a driven differential casing, axle shafts extending therein, differential gears and pinions operatively connecting said axle shafts, change speed gears journaled in said differential casing and affording bearings for the differential gears, a fixed element, a conditioning clutch adapted to either connect one of said change speed gears to said differential casing or to said fixed element, and a reduction clutch rotative with said differential casing and adapted to connect one or the other of said change speed gears for rotation with said differential casing when said conditioning clutch engages said fixed element.

4. In a variable speed transmission mechanism, a driven differential casing, axle shafts extending therein, a differential gear mechanism including a spider for operatively connecting said axle shafts, change speed gears nested about the gears of the differential mechanism, a compound reduction pinion carried by the spider of said differential mechanism, and meshing with said change speed gears, a conditioning clutch adapted to condition one of said change speed gears for high speed and other speeds, and a reduction clutch rotatable with said differential casing and engageable with other of said change speed gears and adapted to establish low and intermediate speeds when said conditioning clutch is in position for holding its change speed gear for such speeds.

5. A variable speed mechanism as called for in claim 4, wherein said clutches are slidable co-axially of each other and said conditioning clutch adapted for rotation with one of said speed gears.

6. In a variable speed mechanism, a driven differential casing, axle shafts extending therein, differential gears and pinions operatively connecting said axle shafts, a fixed element, low and intermediate speed gears at one side of said differential casing, a speed gear at the opposite side of said differential casing, a conditioning clutch rotatable with said speed gear and adapted to either fix said gear to said differential casing for high speed or to said fixed element for low and intermediate speeds, a conditioning clutch rotatable with said differential casing and engageable with either said low or intermediate speed gear to establish either speed when said speed gear is conditioned by its clutch engaging said fixed element, and a compound pinion associated with said differential pinions and having elements meshing with said speed gears.

7. Variable speed transmission mechanism as called for in claim 6, wherein a spider forms part of the differential gear mechanism and supports said compound gear in spaced relation to said differential casing.

8. In a variable speed transmission mechanism, fixed and rotatable elements, a pair of axle shafts, change speed gears rotatable about said shafts, means for selectively connecting said gears to said fixed and rotatable elements, differential gears mounted on said shafts, a spider rotatable about said axle shafts and having arms, differential gears mounted on said arms in mesh with said first-named differential gears a compound gear on each arm and meshing with certain of said change speed gears, and bearings interposed between each arm and the compound gear carried thereby.

In testimony whereof I affix my signature.

ARTHUR A. WIEDMAIER.